(12) United States Patent
Williamson

(10) Patent No.: US 8,984,013 B2
(45) Date of Patent: Mar. 17, 2015

(54) CONDITIONING THE DISTRIBUTION OF DATA IN A HIERARCHICAL DATABASE

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 721 days.

(21) Appl. No.: 12/571,009

(22) Filed: Sep. 30, 2009

(65) Prior Publication Data

US 2011/0078200 A1 Mar. 31, 2011

(51) Int. Cl.
*G06F 17/30* (2006.01)

(52) U.S. Cl.
CPC .... *G06F 17/30589* (2013.01); *G06F 17/30923* (2013.01)
USPC ........... 707/791; 707/802; 707/814; 707/822; 707/828

(58) Field of Classification Search
CPC ....................................... G06F 17/30
USPC .................................. 707/600–899
See application file for complete search history.

(56) References Cited

U.S. PATENT DOCUMENTS

| | | | |
|---|---|---|---|
| 5,701,137 A | 12/1997 | Kiernan et al. | |
| 5,878,415 A | 3/1999 | Olds | |
| 5,890,167 A | 3/1999 | Bridge, Jr. et al. | |
| 5,911,072 A | 6/1999 | Simonyi | |
| 5,978,796 A | 11/1999 | Malloy et al. | |
| 6,070,007 A | 5/2000 | Simonyi | |
| 6,360,188 B1 | 3/2002 | Freidman et al. | |
| 6,366,922 B1 | 4/2002 | Althoff | |
| 6,415,283 B1 | 7/2002 | Conklin | |
| 6,424,967 B1 | 7/2002 | Johnson et al. | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,897,885 B1 | 5/2005 | Hao et al. | |
| 6,931,418 B1 | 8/2005 | Barnes | |
| 7,133,876 B2 | 11/2006 | Roussopoulos et al. | |
| 7,152,062 B1 | 12/2006 | Draper et al. | |
| 7,249,118 B2 | 7/2007 | Sandler et al. | |
| 7,299,241 B2 | 11/2007 | Reed et al. | |
| 7,519,701 B1 | 4/2009 | Bogner | |

(Continued)

OTHER PUBLICATIONS

Williamson, "Systems and Methods for Generating Iterated Distributions of Data in a Hierarchical Database", U.S. Appl. No. 12/627,225, filed Nov. 30, 2009.

(Continued)

*Primary Examiner* — Isaac M Woo
(74) *Attorney, Agent, or Firm* — Lowenstein Sandler LLP

(57) ABSTRACT

Embodiments relate to systems and methods for conditioning the distribution of data in a hierarchical database. A data store can store data in a hierarchical format. Higher-level data, such as yearly profit, may be desired to be spread from parent nodes to lower nodes, such as quarters. Parent nodes can be associated with a set of programmatic placeholder nodes. A spreading tool can insert child nodes representing quarters, months, or other at insertion point(s) represented or encoded by a set of placeholder nodes, dividing quantities appropriately. In aspects, data can be spread from multiple parents at once. In aspects, the spreading tool can access or host sequence logic to ensure that data is spread in an order that takes dependencies, formatting, output connections, or other factors into account.

18 Claims, 4 Drawing Sheets

(56) References Cited

U.S. PATENT DOCUMENTS

| | | | |
|---|---|---|---|
| 7,571,192 B2 | 8/2009 | Gupta et al. | |
| 7,660,822 B1 | 2/2010 | Pfleger | |
| 7,681,087 B2 | 3/2010 | Simpson et al. | |
| 7,689,565 B1* | 3/2010 | Gandhi et al. | 707/999.01 |
| 7,697,518 B1* | 4/2010 | de Wit | 370/389 |
| 7,734,585 B2 | 6/2010 | Sharma et al. | |
| 7,809,759 B1 | 10/2010 | Bruso et al. | |
| 7,853,609 B2 | 12/2010 | Dehghan et al. | |
| 8,396,880 B2 | 3/2013 | Williamson | |
| 8,589,344 B2 | 11/2013 | Williamson | |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |
| 2002/0087516 A1 | 7/2002 | Cras et al. | |
| 2002/0169658 A1 | 11/2002 | Adler | |
| 2003/0085997 A1 | 5/2003 | Takagi et al. | |
| 2003/0093755 A1 | 5/2003 | O'Carroll | |
| 2003/0114950 A1 | 6/2003 | Ruth et al. | |
| 2003/0115194 A1 | 6/2003 | Pitts et al. | |
| 2003/0115207 A1 | 6/2003 | Bowman et al. | |
| 2003/0120372 A1 | 6/2003 | Ruth et al. | |
| 2003/0126114 A1 | 7/2003 | Tedesco | |
| 2003/0184585 A1 | 10/2003 | Lin et al. | |
| 2003/0225736 A1 | 12/2003 | Bakalash et al. | |
| 2004/0039736 A1 | 2/2004 | Kilmer et al. | |
| 2004/0133552 A1 | 7/2004 | Greenfield et al. | |
| 2004/0139061 A1 | 7/2004 | Colossi et al. | |
| 2005/0004904 A1 | 1/2005 | Kearney et al. | |
| 2005/0010566 A1 | 1/2005 | Cushing et al. | |
| 2005/0028091 A1* | 2/2005 | Bordawekar et al. | 715/514 |
| 2005/0060382 A1 | 3/2005 | Spector et al. | |
| 2005/0132070 A1 | 6/2005 | Redlich et al. | |
| 2005/0228798 A1 | 10/2005 | Shepard et al. | |
| 2005/0278354 A1 | 12/2005 | Gupta et al. | |
| 2006/0004833 A1 | 1/2006 | Trivedi et al. | |
| 2006/0026122 A1 | 2/2006 | Hurwood et al. | |
| 2006/0036707 A1 | 2/2006 | Singh et al. | |
| 2006/0122996 A1* | 6/2006 | Bailey | 707/4 |
| 2006/0136462 A1 | 6/2006 | Campos et al. | |
| 2006/0262145 A1 | 11/2006 | Zhang et al. | |
| 2007/0022093 A1 | 1/2007 | Wyatt et al. | |
| 2007/0027904 A1 | 2/2007 | Chow et al. | |
| 2007/0088757 A1 | 4/2007 | Mullins et al. | |
| 2007/0143390 A1 | 6/2007 | Giambalvo et al. | |
| 2007/0208721 A1 | 9/2007 | Zaman et al. | |
| 2008/0104141 A1 | 5/2008 | McMahon | |
| 2008/0140696 A1 | 6/2008 | Mathuria | |
| 2008/0172405 A1 | 7/2008 | Feng et al. | |
| 2008/0243778 A1 | 10/2008 | Behnen et al. | |
| 2008/0294596 A1 | 11/2008 | Xiong | |
| 2008/0320023 A1 | 12/2008 | Fong | |
| 2009/0100086 A1 | 4/2009 | Dumant et al. | |
| 2009/0144319 A1 | 6/2009 | Panwar et al. | |
| 2009/0182837 A1* | 7/2009 | Rogers | 709/215 |
| 2009/0193039 A1 | 7/2009 | Bradley et al. | |
| 2009/0199086 A1* | 8/2009 | Wake | 715/235 |
| 2009/0222470 A1 | 9/2009 | Kemp et al. | |
| 2009/0254572 A1 | 10/2009 | Redlich et al. | |
| 2009/0292726 A1 | 11/2009 | Cormode et al. | |
| 2009/0307200 A1 | 12/2009 | Ignat et al. | |
| 2009/0307336 A1 | 12/2009 | Hieb | |
| 2009/0319546 A1 | 12/2009 | Shaik | |
| 2010/0057700 A1 | 3/2010 | Williamson | |
| 2010/0057777 A1 | 3/2010 | Williamson | |
| 2010/0085979 A1* | 4/2010 | Liu et al. | 370/408 |
| 2010/0131440 A1 | 5/2010 | Chen et al. | |
| 2010/0131456 A1 | 5/2010 | Williamson | |
| 2010/0146041 A1 | 6/2010 | Gentry et al. | |
| 2010/0169299 A1 | 7/2010 | Pollara | |
| 2010/0305922 A1 | 12/2010 | Williamson | |
| 2010/0306254 A1 | 12/2010 | Williamson | |
| 2010/0306255 A1 | 12/2010 | Williamson | |
| 2010/0306272 A1 | 12/2010 | Williamson | |
| 2010/0306281 A1 | 12/2010 | Williamson | |
| 2010/0306340 A1 | 12/2010 | Williamson | |
| 2010/0306682 A1 | 12/2010 | Williamson | |
| 2011/0050728 A1 | 3/2011 | Williamson | |
| 2011/0054854 A1 | 3/2011 | Williamson | |
| 2011/0055680 A1 | 3/2011 | Williamson | |
| 2011/0055761 A1 | 3/2011 | Williamson | |
| 2011/0055850 A1 | 3/2011 | Williamson | |
| 2011/0078199 A1 | 3/2011 | Williamson | |
| 2011/0078200 A1 | 3/2011 | Williamson | |
| 2011/0131176 A1 | 6/2011 | Williamson | |
| 2011/0131220 A1 | 6/2011 | Williamson | |
| 2011/0158106 A1 | 6/2011 | Williamson | |
| 2011/0161282 A1 | 6/2011 | Williamson | |
| 2011/0161374 A1 | 6/2011 | Williamson | |
| 2011/0161378 A1 | 6/2011 | Williamson | |
| 2011/0299427 A1 | 12/2011 | Chu et al. | |
| 2012/0054131 A1 | 3/2012 | Williamson | |
| 2012/0054212 A1 | 3/2012 | Williamson | |
| 2012/0130979 A1 | 5/2012 | Williamson | |
| 2012/0131014 A1 | 5/2012 | Williamson | |
| 2012/0136824 A1 | 5/2012 | Williamson | |
| 2012/0136879 A1 | 5/2012 | Williamson | |
| 2012/0136903 A1 | 5/2012 | Williamson | |

OTHER PUBLICATIONS

Williamson, "Systems and Methods for Generating an Optimized Output Range for a Data Distribution in a Hierarchical Database", U.S. Appl. No. 12/627,256, filed Nov. 30, 2009.

Williamson, "Systems and Methods for Distribution of Data in a Hierarchical Database via Placeholder Nodes", U.S. Appl. No. 12/570,704, filed Sep. 30, 2009.

Using OLAP and Multi-Dimensional data for decision making, Hasan et al. IEEE 2001.

A new OLAP aggregation based on the AHC technique, Massaoud et al. DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

Williamson, "Systems and Methods for Validating Interpolation Results Using Monte Carlo Simulations on Interpolated Data Inputs", U.S. Appl. No. 13/037,344, filed Feb. 28, 2011.

(56) References Cited

OTHER PUBLICATIONS

ASPFAQ.com, "What are the valid styles for converting datetime to string?", (2006) http://database.aspfaq.com/database/what-are-the-valid-styles-for-converting-datetime-to-string.html.
Answering joint Queries from Multiple Aggregate OLAP Databases, Pourabbas et al, LNCS 2737, pp. 24-34, 2003.
Alison et al., Oracle Warehouse Builder User's Guid 10g Release 1 (10.1) Sep. 7, Oracle Corporation, all.
Fausett, Fundamentals of Neural Networks: Architectures, Algorithms, and Applications, 1994, 1st Ed, Table of Contents.
Fogel, Oracle Database Administrators Guide May 2006, Oracle, 10g Release 2, all.
Google Search Results for Keywords Neural Network Rule Production, 22 Feb 12, Google.com, http://google.com.
Howe, Iteration 4, Apr. 2009, Foldoc.org., http://foldoc.org/iteration.
Hoffman, Karla, Combinatorial Optimization: Current Successes and Directions for the Future, Jan. 31, 2000, Journal of Computational and Applied Mathematics 124 (2000), 341-360.
Lane et al., Oracle Database Data Warehouse Builder User's Guide l0g Release 1 (10.2) Dec 5, Oracle Corporation, all.
Li et al., Research of Image Affective Semantic Rules Based on Neural Network, 2008, 2008 International Seminar on Future BioMedical Information Engineering, 148-151.
Oracle Database Online Documentation 10g Release 2 10.2, 2009, Oracle Corporation, all, retrieved Nov. 15, 2012 from http://web.archive.org/web/20090318143217/http://www.oracle.com/pls/db102/portal.portal_db.
Oracle Warehouse Documentation 10g Release 1, 2007, Oracle Corporation, all; retrieved Mar. 29, 2012 from http://docs.oracle.com/cd/E10926_01/welcome.html.
Parasuraman et al. "A Model for Types and Levels of Human Interaction with Automation" May 30, 2000, IEEE, IEEE Transactions on Systems, Mayn and Cybernetics—Part A: Systems and Humans, vol. 30, No. 3, 286-297.
Wood et al., Document Object Model (DOM) Level 1 Specification, Oct 1998, Version 1, http://www.w3org.TR/RCE-DOM-Level_1/level-one-core.html#ID-1CED5498.
Rule, Define Rule at Dictionary.com, accessed Feb. 12, 2012, dictionary.com, http://dictionary.reference.com/browse/rule.
Oracle row count for all tables in schema 28 Apr. 9, Burlseson Consulting, http://www.dba-oracle.com/ t_count_rows_all_tables_in_schema.htm.
Office Action for U.S. Appl. No. 12/627,225, mailed Oct. 23, 2012.
Office Action for U.S. Appl. No. 12/627,225, mailed Mar. 27, 2013.
Notice of Allowance for U.S. Appl. No. 12/627,225, mailed Jul. 18, 2013.
Office Action for U.S. Appl. No. 12/627,225, mailed Jan. 5, 2012.
Office Action for U.S. Appl. No. 12/627,225, mailed Apr. 2, 2012.
Office Action for U.S. Appl. No. 12/627,225, mailed Jun. 14, 2012.
Notice of Allowance for U.S. Appl. No. 12/627,256, mailed Nov. 9, 2012.
Advisory Action for U.S. Appl. No. 12/627,256, mailed May 1, 2012.
Office Action for U.S. Appl. No. 12/627,256, mailed Nov. 15, 2011.
Office Action for U.S. Appl. No. 12/627,256, mailed Feb. 23, 2012.
Office Action for U.S. Appl. No. 12/627,256, mailed Jun. 5, 2012.
Office Action for U.S. Appl. No. 12/651,195, mailed Feb. 22, 2012.
Notice of Allowance for U.S. Appl. No. 12/651,195, mailed Jul. 16, 2012.
Office Action for U.S. Appl. No. 12/651,219, mailed Dec. 21, 2011.
Office Action for U.S. Appl. No. 12/651,219, mailed May 24, 2012.
Advisory Action for U.S. Appl. No. 121651,219, mailed Aug. 13, 2012.
Advisory Action for U.S. Appl. No. 12/651,219, mailed Aug. 15, 2014.
Office Action for U.S. Appl. No. 12/651,219, mailed Jun. 9, 2014.
Office Action for U.S. Appl. No. 12/651,219, mailed Dec. 17, 2013.
Office Action for U.S. Appl. No. 12/570,704, mailed Apr. 24, 2013.
Advisory Action for U.S. App. No. 12/570,704 mailed Apr. 23, 2012.
Office Action for U.S. App. No. 12/570,704, mailed Feb. 1, 2012.
Office Action for U.S. Appl. No. 12/570,704, mailed Jul. 19, 2012.
Office Action for U.S. Appl. No. 12/651,140, mailed Dec. 16, 2011.
Office Action for U.S. Appl. No. 12/651,140, mailed Apr. 3, 2012.
Office Action for U.S. Appl. No. 12/651,140, mailed Dec. 30, 2013.
Advisory Action for U.S. Appl. No. 12/651,140, mailed Jun. 12, 2012.
Notice of Allowance for U.S. Appl. No. 12/651,140, mailed Jun. 30, 2014.

\* cited by examiner

CONDITIONING THE DISTRIBUTION OF DATA IN A HIERARCHICAL DATABASE

FIELD

The present teachings relate to systems and methods for conditioning the distribution of data in a hierarchical database, and more particularly to systems and techniques for distributing data from parent nodes to a set of child nodes in spreading or other operations, based on rules-based sequencing or other conditioning of the data distribution.

BACKGROUND OF RELATED ART

In networked database technologies, hierarchical databases such as online analytical processing (OLAP) databases, extensible markup language (XML)-based data stores, and others are known. During operations with hierarchical data stores, it is sometimes necessary or desirable to add or insert additional data values into nodes which lie beneath the parent node in the hierarchy. For instance, if a parent node stores financial data reflecting annual profit for a corporation or other entity, it may be desired at the same time or a later time to insert lower-level breakdowns of that data over smaller intervals. For example, it may be desired to insert child nodes which store quarterly or monthly profit for that entity. In general, the process of pushing or distributing data down to child nodes or other destinations in the database structure can be referred to as "spreading" the data.

In known database platforms, the ability to perform spreading operations can be constrained or limited by limitations in the data structures and logical operations permitted on those platforms. For one, while platforms may exist which permit a user to insert a new child node at a lower level in relation to a parent node, data may only be distributed down from one parent at a time. If, for instance, annual profit is intended to be expanded or spread down to quarterly profit entries over the last ten years or some other group of years, the user may be forced to manually insert the child nodes and manually perform the spreading, year by year.

For another, when performing distribution of data between nodes or levels in a hierarchical data store, the order in which spreading is performed can have effects which the database engine does not take into account. For instance, when spreading annual profit down to quarterly nodes, it may be necessary to check for special charge offs or other factors against profit in a given quarter, or profit for a first fiscal quarter may be affected by a carry-over entry from the previous fiscal year end. Other factors or dependencies can apply, but existing database platforms do not permit the incorporation of dependency rules or other logic to ensure data accuracy or integrity. Other shortcomings in existing database engines exist. It may be desirable to provide systems and methods for conditioning the distribution of data in a hierarchical database which permit the insertion of child levels and distribution of data from multiple parent nodes at the same time, and which permit dependency rules or other logic to be applied.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
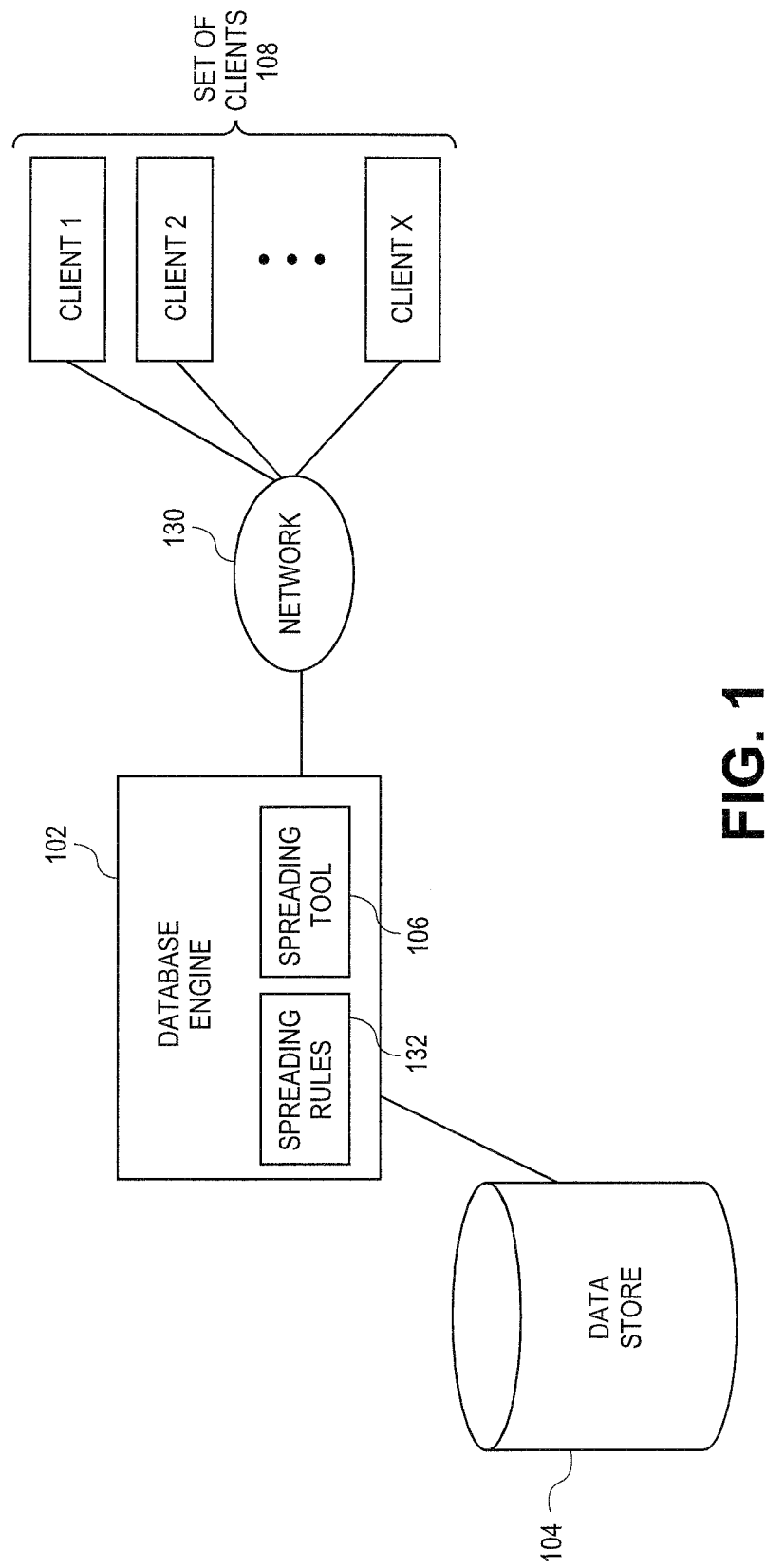
FIG. 1 illustrates an overall system in which for systems and methods for conditioning the distribution of data in a hierarchical database, according to various embodiments.

Embodiments of the present teachings relate to systems and methods for conditioning the distribution of data in a hierarchical database. More particularly, embodiments relate to platforms and techniques for accessing a set of hierarchical data, such as data stored in OLAP, XML, or other data sources, and manipulating that data for distribution or spreading to lower hierarchical levels. In embodiments, a set of placeholder nodes can be associated with a set of parent nodes, to act as points for insertion for child nodes or other lower level structures, at a current or later time. In embodiments, the placeholder nodes can store linkages to one or more parent nodes, and in embodiments can be invisible to users of the associated database engine until viewing or spreading operations are desired. In embodiments, the set of placeholder nodes can also further represent programmatically manipulable objects, which, for instance, encode inheritance rules, output pipes, or other linkages, or other logic or functions for the subsequent child nodes inserted in their place or at their location. In embodiments, the set of placeholder nodes can be generated, configured, and managed by a spreading tool of an associated database engine which manages the overall hierarchical data store.

When the spreading of data to child nodes or levels is desired, a user can access the spreading tool and view and manipulate the set of placeholder nodes to insert one or more sets of child nodes configured to receive data from, or data derived from, the corresponding parent node. In embodiments, the spreading tool and/or other logic can access the set of placeholder nodes involved in distribution activity, and use those nodes as insertion points to populate the hierarchical data store with new, additional, and/or updated child nodes to receive data. In embodiments, identical, and/or or related placeholder nodes can be associated with more than one parent node, so that, among other things, a set of child nodes and subsequent distribution of data can be performed from multiple parent nodes at the same time. In embodiments, the spreading tool can delete the set of placeholder nodes when a spreading operation or other distribution has been completed. In embodiments, the spreading tool can in addition or instead retain any placeholder nodes used in a distribution of data to child nodes, for instance to maintain a record of the distribution activity. In embodiments, the spreading tool can access and apply a set of spreading rules and/or other logic to ensure data integrity or accuracy in view of potential data dependencies, data formatting requirements, and/or other factors affecting the distribution or computation of data stored in or related to the hierarchical database.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall system 100 in which systems and methods for conditioning the distribution of data in a hierarchical database can operate, according to various embodiments. A set of clients 108 can communicate with a database engine 102 via one or more network 130. database engine 102 can be or include storage, hardware, software, and/or other resources to execute database operations, such as accessing and manipulating OLAP data stores, XML data stores, other database stores, engines, or applications, statistical applications, spreadsheet applications, or other services or applications. database engine 102 can communicate with and manage a hierarchical data store 104, such as an OLAP database, an XML-based database, and/or other data store. Set of clients 108 can be or include, for example, a set of local or remote desktop computers, laptop computers, wireless devices, and/or other machines or devices which communicate with one or more network 130 can be or include, for example, the Internet or other public or private networks. database engine 102 can be or include a server with associated memory, storage, and other resources configured to receive database requests from one or more clients in set of clients 108, and interpret that request to perform database operations on data maintained in data store 104.

As likewise shown in FIG. 1, a user of a client in set of clients 108 can invoke or instantiate spreading tool 106 of database engine 102 via a local application or interface, such as a Web browser, database application, or other software. Spreading tool 106 can, in general, contain logic, storage, and/or other resources to effectuate the distribution, transfer, copying, or other communication of data from parent or other upper-level nodes in data store 104 to child nodes or other destinations via a set of placeholder nodes. In aspects, the set of placeholder nodes can as placeholders, and can be stored in reserve storage and/or memory locations which can act as insertion points for new or modified child nodes for levels of data that a user may later choose to insert. In embodiments, each placeholder node 114 can act not merely or only as a temporary, shadow, or otherwise passive storage location or object, but as a programmatically configurable object which is capable of establishing inheritance and other properties for the set of child nodes derived from that placeholder. In embodiments, during the distribution of data to any inserted child nodes, spreading tool 120 can access a set of spreading rules 132 to ensure that functional or other dependencies, data formatting, and other data integrity requirements are met.

Figure 2:
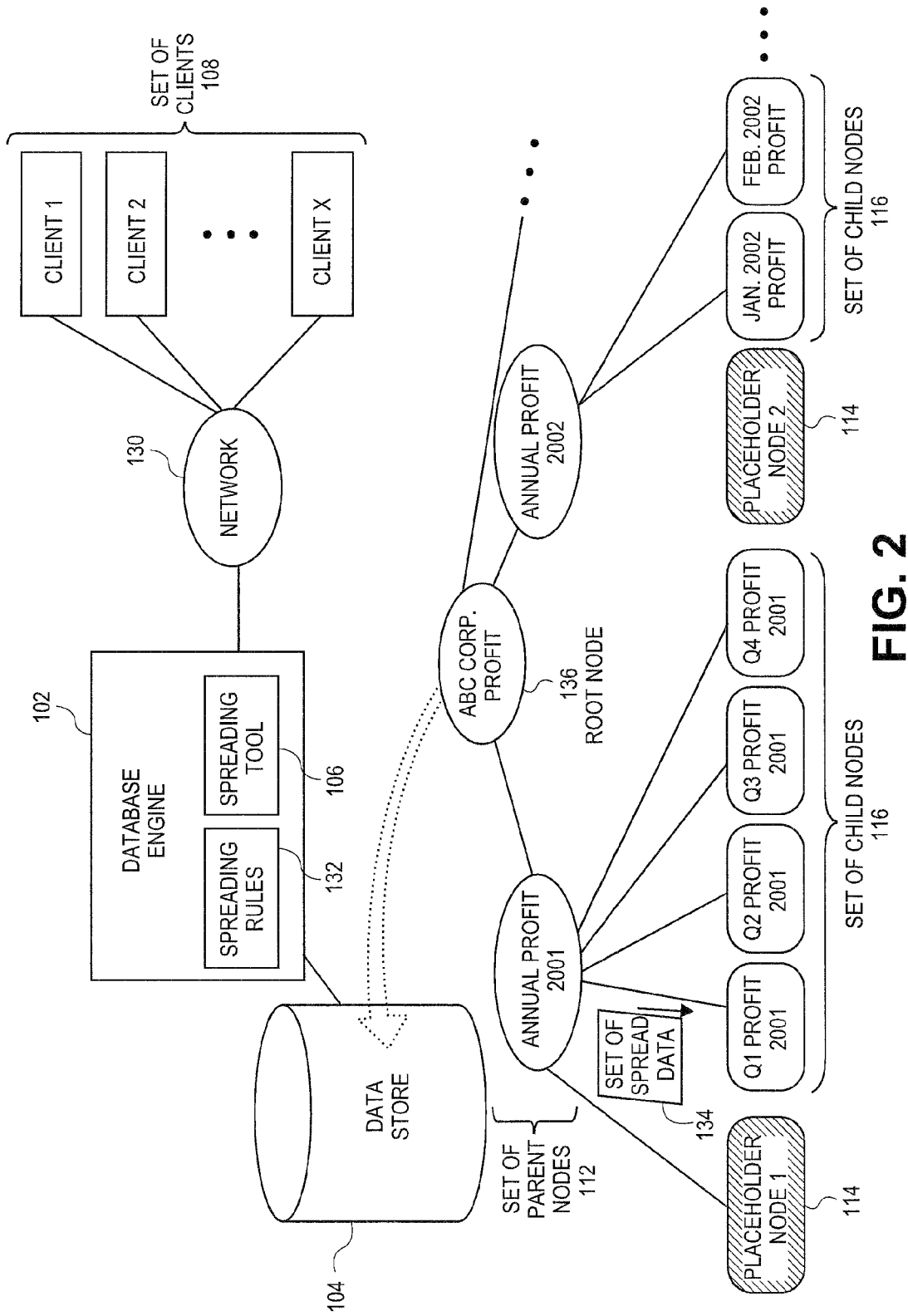
FIG. 2 illustrates an illustrative distribution of data from one or more parent levels to one or more child levels in a hierarchical data store, according to various embodiments.

More particularly, as shown, for example, in FIG. 2, the hierarchical data store 104 can comprise hierarchical data structures including, for instance, a set of parent nodes 112. Set of parent nodes 112 can be linked to a root node 136, illustratively shown as profit for a corporation, although it will be understood that any other data type, category, or format can be used. Set of parent nodes 112 are illustratively shown as encoding a set of annual profit data arranged in parent nodes each representing one year, although, again, other data types and configurations can be used. In aspects, data other than financial data, such as, for example, medical, technical, scientific, and/or other data can be processed according to embodiments of the present teachings.

In embodiments as shown, the set of parent nodes 112 can have an associated set of placeholder nodes 114 linked to them. In embodiments, each parent node in set of parent nodes 112 can have one or more placeholder nodes associated with it. In embodiments, only a subset of set of parent nodes 112 can have an associated set of placeholder nodes 114 established or linked to them. In embodiments, each of the placeholder nodes can constitute a "leaf" node, that is, a node not having any further child nodes. In embodiments, each placeholder node in set of placeholder nodes 114 can occupy a lower level in data store than 104 than its associated parent node, although in aspects the set of placeholder nodes 114 need not all occupy the same level of data store 104. In embodiments, set of placeholder nodes 114 can define data fields and formats that can be used to populate a set of child nodes 116 that will be inserted into data store 104.

In embodiments, when a user of set of clients 108 or other user wishes to access data store 104 and insert new or updated child nodes in that data structure, the user can access spreading tool 106 via network 130. The user can use spreading tool 106 to locate one or more placeholder nodes in set of placeholder nodes 114 via which the user wishes to add one or more set of child nodes 116. In aspects, a user may for instance access a placeholder node in set of placeholder nodes 114 associated with an annual profit node for the year 2001 in set of parent nodes 112. The user can insert, for instance, set of four child nodes representing quarterly profit derived from the annual profit parent node for that year. According to embodiments, the user can direct spreading tool 106 to initiate the spreading or distribution of annual profit data down to the lower-level set of child nodes 116.

Spreading tool 106 can perform the distribution by dividing the annual profit data encoded in the associated parent node (e.g. year 2001 profit as shown) equally into four quarters, and transmitting the resulting set of spread data 134 to each of the set of child nodes 116 associated with that parent node. In embodiments, the set of spread data 134 need not be equally divided over all child nodes associated with the parent node. In embodiments, the same or different set of spread data 134 can be generated and distributed from more than one parent in set of parent nodes 112 at the same time, or as part of the same operation. Other types of child nodes, levels, and formats of set of spread data 134 can be used, including, for instance, monthly profit nodes, as likewise shown in FIG. 2. Other structures, layers, and relationships between levels of information stored in data store 104 can be used.

In embodiments, in addition to defined data structures, each node in set of placeholder nodes 114 can encode or represent a set of specifications for inheritance by set of child nodes 116, or other programmatic information for determining the configuration of set of child nodes 116 or any aspect of their operation. In embodiments, set of placeholder nodes 114 can serve as passive data-structure objects, acting as a reserve storage or insertion point, a database flag, a database event trigger. In embodiments, increased flexibility in data spreading operations can be enhanced by establishing and utilizing set of placeholder nodes with a set of attributes and/or metadata to allow those nodes to operate as programmatic objects in themselves. For instance, in embodiments, set of placeholder nodes 114 can be configured as an event or function that triggers a rule, and can for example form part of the object inheritance from one or more parent nodes, themselves. For example, set of placeholder nodes 114 can be configured to force set of spread data 134 to conform to U.S. dollar figures or format, and for instance to perform currency conversions to that denomination automatically. For further example, set of placeholder nodes 114 can store linkages, interfaces, mappings, and/or relationships to other nodes that will require outputs from the set of child nodes 116, once those nodes are installed and populated with data. Other programmatic settings can be configured in set of placeholder nodes 114. In embodiments, the programmatic settings stored in or associated with set of child nodes 114 can be updated or extended at any time.

It may be noted that in embodiments, spreading tool 106 can condition or process the set of spread data 134 transmitted to one or more child nodes before sending that information, to ensure data integrity or consistency. In embodiments, spreading tool 106 can invoke or access set of spreading rules 132 and/or other logic to ensure that data spread from set of parent nodes 112 is distributed to child nodes in a correct or consistent order. In embodiments, set of spreading rules 132 can specify that certain child nodes whose data or output is needed by other nodes are the first to receive set of spread data 134. In embodiments, set of spreading rules 132 can specify that set of spread data 134 be encoded in or converted to formats required by recipient nodes or other destinations. In embodiments, set of spreading rules 132 can enforce or apply other logic or rules to ensure that set of spread data 134 is transmitted, formatted, computed, or otherwise manipulated to preserve the consistency or integrity of set of spread data 134 and/or any calculations, outputs, and/or services that use or depend on that data. It may be noted that in embodiments, the same or different spreading rules in set of spreading rules 132 can be applied to distributions from two or more parent nodes, in cases where a distribution is carried out from more than one parent node at a time.

Figure 3:
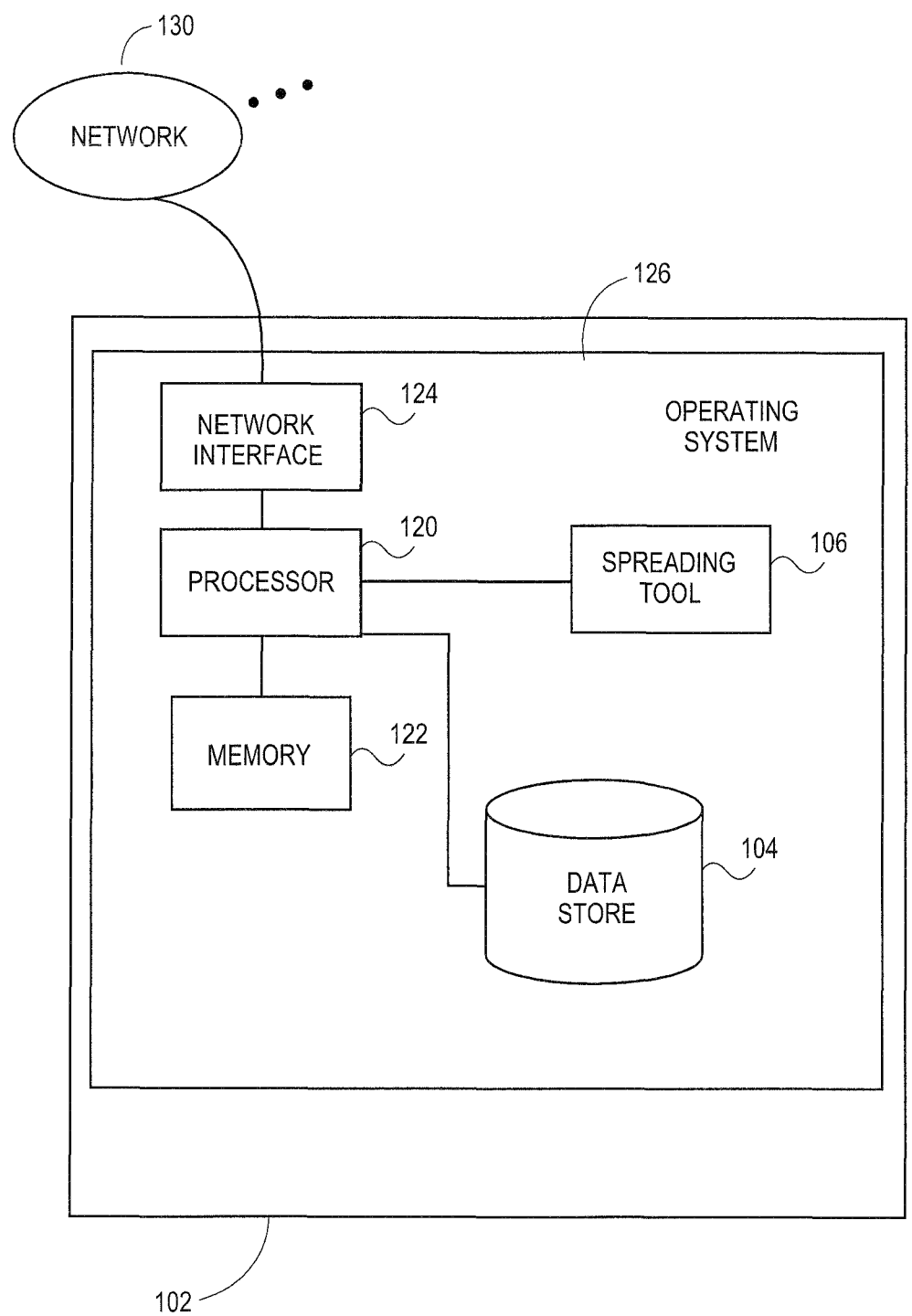
FIG. 3 illustrates an illustrative hardware configuration of hardware that can implement a database engine, consistent with various embodiments of the present teachings.

FIG. 3 illustrates an exemplary configuration of database engine 102 which can be used in systems and methods for conditioning the distribution of data in a hierarchical database, according to embodiments. In embodiments as shown, database engine 102 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with data store 104, such as a local or remote database, which can be stored, for instance, on one or more hard drives, optical drives, magnetic drives, electronic memory, and/or other storage. Processor 120 further communicates with network interface 124, such as an Ethernet or wireless data connection, which in turn communicates with one or more network 130, such as the Internet or other public or private networks. Processor 120 can, for example, communicate with set of clients 108 via one or more network 130. Processor 120 also communicates with database engine 102, spreading tool 106, and/or other resources to control the processing of hierarchical data including transfer of data between set of parent nodes 112, set of placeholder nodes 114, set of child nodes 116, and/or other nodes, entries, fields, and/or locations. Other configurations of database engine 102, associated network connections, and other hardware and software resources are possible.

Figure 4:
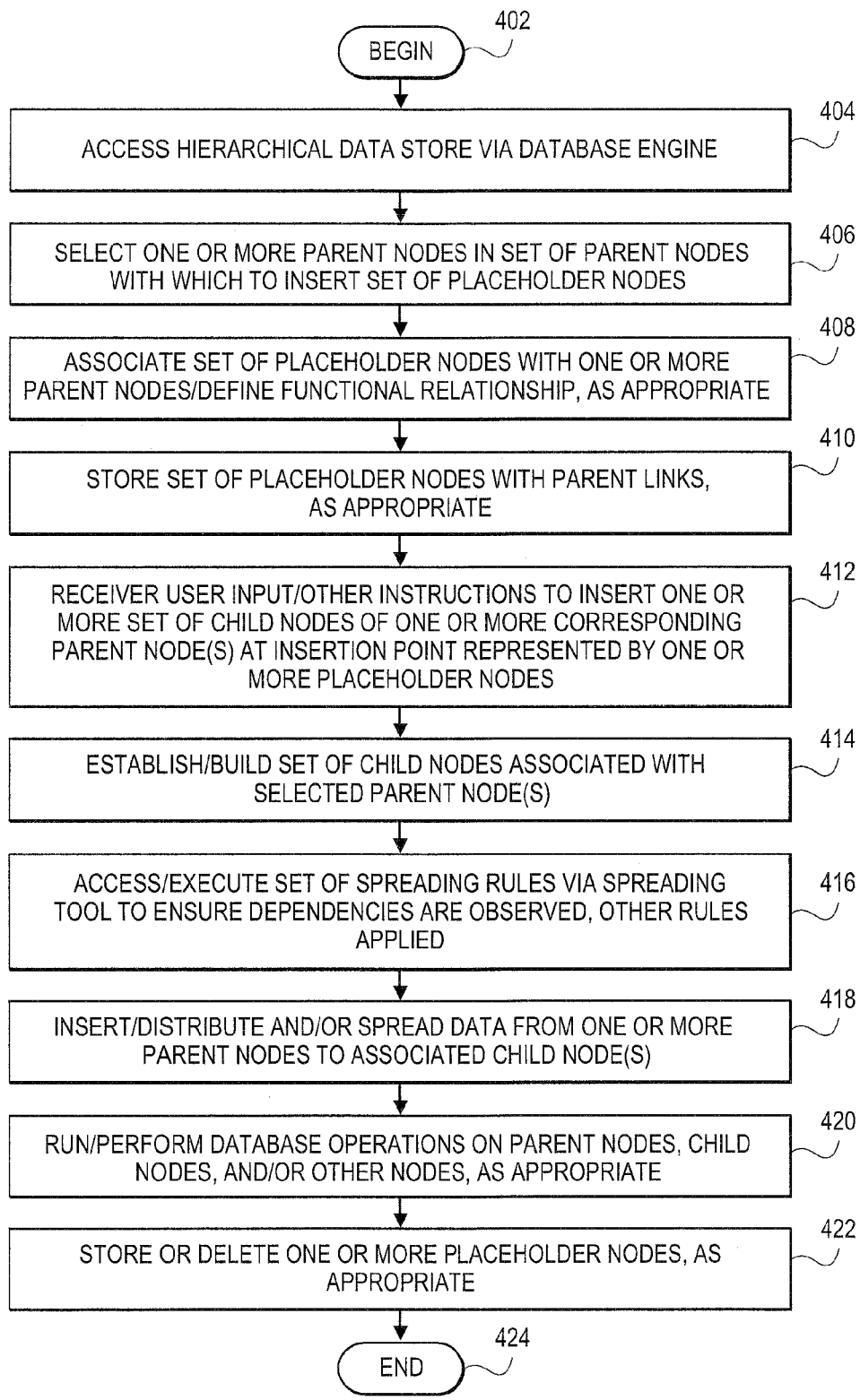
FIG. 4 illustrates overall data aggregation processing to generate distributions of data to lower hierarchical levels via placeholder nodes, according to various embodiments.

FIG. 4 illustrates a flowchart of data processing operations that can be used in systems and methods for conditioning the distribution of data in a hierarchical database, according to various embodiments. In 402, processing can begin. In 404, a hierarchical data store 104 can be accessed via database engine 102, for instance, by request from a client in set of clients 108, or other request. In 406, one or more parent nodes in set of parent nodes 110 can be selected with which or in which to insert a set of placeholder nodes 114. In 408, set of placeholder nodes 114 can be associated with one or more parent nodes in set of parent nodes 110, for instance, by selection or input by a user. In embodiments, a functional relationship between the one or more parent nodes and set of placeholder nodes 114 can be defined, such as, for example, to define set of placeholder nodes 114 to contain or represent a division of annual profit stored in the associated parent node over quarters or other periods. In embodiments, a functional relationship need not be defined when configuring set of placeholder nodes 114. In embodiments, a functional relationship can be defined or updated at various later times.

In 410, set of placeholder nodes 114 can be stored to data store 104 or other storage, as appropriate. In 412, spreading tool 106 and/or other logic can receive user input or other instructions to insert one or more child nodes of one or more corresponding parent node(s) at one or more insertion points represented by one or more placeholder nodes in set of placeholder nodes 114. For example, a set of four child nodes representing annual quarters can be established as lower level nodes of a parent node encoding annual profit for a corporation or other entity. In embodiments, the inserted set of child nodes 116 can each occupy the same hierarchical level in data store 104. It may be noted that in embodiments, there may be a one-to-one relationship between a placeholder node and a child node to be introduced at the insertion point represented by the placeholder node. In embodiments, more than one child node may be inserted at the insertion point represented by the placeholder node. Likewise, in embodiments, two or more child nodes in the set of child nodes 116 can occupy different hierarchical levels in data store 104. In embodiments, the inserted set of child nodes 116 can be associated with more than one parent node. For example, in instances the same set of child nodes 116 can be duplicated as newly inserted nodes linked to two or more parent nodes.

In 414, the set of child nodes 116 identified or configured for insertion can be established and/or built in data store 104, for instance, by storing links to one or more parent nodes along with metadata such as functional relationships with the parent node(s) and/or fellow child nodes. Other configuration data can be specified and/or stored. In 416, spreading tool 106 can access a set of spreading rules 132 to ensure that dependencies are observed, and/or other rules are applied in the generation of set of child nodes 116 and/or the distribution or insertion of data into those nodes. For instance, before storing profit to a child node, for example, for Q2 of year 2010, spreading tool 106 can check set of spreading rules 132 whether another node for charge-offs or other special transactions or modifications applies to that time period. For further instance, spreading tool 106 can check set of spreading rules 132 to determine whether a certain type of data format is required for compatibility with the corresponding parent node, an additional node which will receive output from the child node, or by other nodes or functions of data store 104 or otherwise.

In 418, data from the corresponding parent node(s) can be inserted, distributed, and/or spread to one or more associated child nodes in set of child nodes 116. For instance, data for annual profit can be divided over four quarters and spread or inserted into a set of child nodes 116 representing that set of time periods or other intervals. In 420, data engine 102 can run or perform database operations on data store 104, including set of parent nodes 110 and/or any newly configured or updated set of child nodes 116, for instance, to run reports on that information, merge data between nodes or files, or perform other computations/operations. In 422, spreading tool 106 can store one or more nodes of set of placeholder nodes 114, for instance to data store 104 or other local or remote storage, to store a log of the configuration history of data store 104, data distributions performed in data store 104, or other records of database operations. In embodiments, spreading tool 106 can also or instead delete one or more nodes of set of placeholder nodes 114, for instance, when it is determined that the placeholder node(s) will no longer be needed for spreading or other data operations. In 424, processing can repeat, return to a prior processing point, jump to a further processing point, or end.

The foregoing description is illustrative, and variations in configuration and implementation may occur to persons skilled in the art. For example, while embodiments have been described in which data store 104 can consist of or contain explicit OLAP and/or XML-based databases, in embodiments, other types or categories of data sources or formats can be included in data store 104.

Similarly, while embodiments have been described in which a single database engine 102 generates and manages data store 104, in embodiments multiple database engines, for example hosted on multiple servers, can cooperate to generate multiple parent/child mappings, placeholder linkages, distributions, and/or other actions to manage and manipulate hierarchical data. Similarly, while embodiments have been described in which data is hosted and managed in one data store 104, in embodiments, multiple data stores can be used. For further example, while embodiments have been described in which database engine 102 supports database operations including data spreading in connection with a set of local or remote clients 108, in networked fashion, in embodiments database engine 102 and/or other machines or resources can be configured to operate on a stand-alone basis. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    receiving a set of data to be inserted in a hierarchical database;
    associating each of a plurality of child nodes in the hierarchical database with a plurality of parent nodes in the hierarchical database;
    accessing a set of spreading rules identifying an order of distribution of the set of data from the plurality of parent nodes to the corresponding child nodes;
    conditioning, by a hardware processor, the set of data in view of the set of spreading rules; and
    distributing the conditioned set of data from the plurality of parent nodes into the corresponding child nodes.

2. The method of claim 1, wherein the set of spreading rules comprises at least one of a set of rules related to data dependencies in the set of data, a set of rules related to the formatting of the set of data, or a set of rules related to routing of output of the plurality of child nodes to other nodes.

3. The method of claim 2, wherein the set of spreading rules further comprises a set of rules related to data dependencies in the set of data.

4. The method of claim 1, wherein distributing the set of data comprises distributing the set of data via a set of placeholder nodes associated with the plurality of parent nodes.

5. The method of claim 4, wherein the set of placeholder nodes encode a set of inheritance classes defining the plurality of child nodes.

6. The method of claim 1, wherein the set of data comprises at least one of medical data, technical data, scientific data, or financial data.

7. The method of claim 1, wherein the hierarchical database comprises at least one of an online analytical processing (OLAP) data source or an extensible markup language (XML)-based data source.

8. The method of claim 1, wherein the set of data distributed from the plurality of parent nodes to the corresponding child nodes is the same.

9. The method of claim 1, wherein the plurality of parent nodes are located in different levels of the hierarchical database.

10. A system comprising:
    an interface to a hierarchical database; and
    a database engine executable by a hardware processor, to communicate with the interface, the database engine executable by a hardware processor to:
        receive a set of data to be inserted in the hierarchical database,
        associate each of a plurality of child nodes in the hierarchical database with a plurality of parent nodes in the hierarchical database,
        access a set of spreading rules identifying an order of distribution of the set of data from the plurality of parent nodes to the corresponding child nodes,
        condition the set of data in view of the set of spreading rules, and
        distribute the conditioned set of data from the plurality of parent nodes into the corresponding child nodes.

11. The system of claim 10, wherein the set of spreading rules further comprises at least one of a set of rules related to data dependencies in the set of data, a set of rules related to the formatting of the set of data, or a set of rules related to routing of output of the plurality of child nodes to other nodes.

12. The system of claim 11, wherein the set of spreading rules comprises a set of rules related to data dependencies in the set of data, and the set of rules related to data dependencies in the set of data comprises a set of sequence rules specifying the order of distribution of the set of data to the plurality of child nodes.

13. The system of claim 10, wherein distributing the set of data comprises distributing the set of data via a set of placeholder nodes associated with the plurality of parent nodes.

14. The system of claim 13, wherein the set of placeholder nodes encode a set of inheritance classes defining the plurality of child nodes.

15. The system of claim 10, wherein the set of data comprises at least one of medical data, technical data, scientific data, or financial data.

16. The system of claim 10, wherein the hierarchical database comprises at least one of an online analytical processing (OLAP) data source or an extensible markup language (XML)-based data source.

17. The system of claim 10, wherein the set of data distributed the plurality of parent nodes to the corresponding child nodes is the same.

18. A non-transitory computer readable storage medium comprising instructions that, when executed by a hardware processor, cause the processor to perform operations comprising:
    receiving a set of data to be inserted in a hierarchical database;
    associating each of a plurality of child nodes in the hierarchical database with a plurality of parent nodes in the hierarchical database;
    accessing a set of spreading rules identifying an order of distribution of the set of data from the plurality of parent nodes to the corresponding set of child nodes;
    conditioning, by the processor, the set of data in view of the set of spreading rules; and
    distributing the conditioned set of data from the plurality of parent nodes into the corresponding child nodes.

* * * * *